Figure 4:
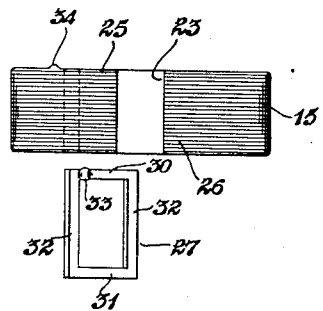

Sept. 6, 1949.   J. B. HARDIE   2,481,113
SHADING COIL
Filed Feb. 13, 1947   2 Sheets-Sheet 1
Fig.1
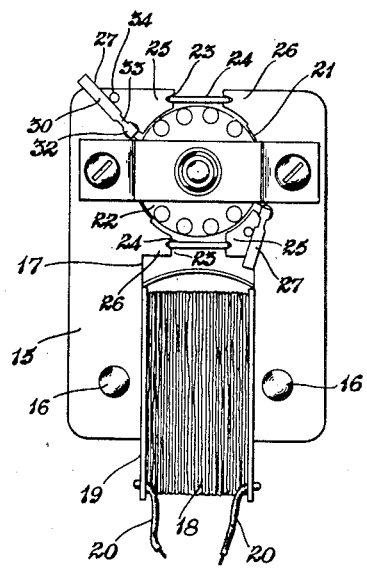
Fig.8.
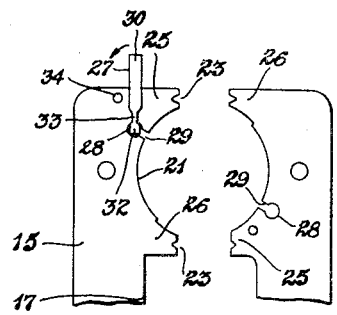
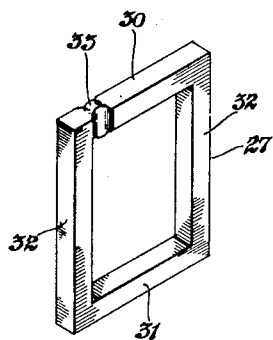
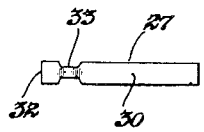
Fig.3
Fig.2
Inventor
James B. Hardie
By
Fraser and Bishop
Attorneys Patented Sept. 6, 1949

2,481,113

UNITED STATES PATENT OFFICE 2,481,113

SHADING COIL

James B. Hardie, Alliance, Ohio, assignor to The Alliance Manufacturing Company, Alliance, Ohio, a corporation of Ohio Application February 13, 1947, Serial No. 728,359

7 Claims. (Cl. 172—278)

The invention relates to magnetic circuits requiring shading coils, and more particularly to a novel type of shading coil for shading the poles of such magnetic circuits. Although the invention is applicable to various devices of this general character, for the purpose of illustration it is hereinafter shown and described as applied to the shaded poles of an induction motor.

The shaded pole type of induction motor has come into general use for phonograph turntable drives and many other purposes where a small inexpensive, constant speed, self starting motor is required.

Motors of this type include a stator, or field member, built up of a stack of iron plates riveted or otherwise connected together in a unit and having one end thereof surrounded by a coil of wire secured upon an insulation spool, opposite ends of the coil being connected to a power line or other suitable source of electric energy.

The stator laminations are apertured at the other end of the motor to provide a substantially circular opening within which is mounted a cylindrical rotor, which may be of squirrel cage type, the laminations being cut away on diametrically opposite sides of this cylindrical opening, providing air gaps at the ends of the opposite pole pieces, and a shading coil surrounds a portion of each pole piece.

In many electric motors and other magnetic devices, one side of each pole piece is provided with a notch having a restricted entrance opening to receive a shading coil, this being necessary for optimum performance, and since it is desirable that the shading coil substantially fill this notch, it is customary to form each shading coil from a heavy copper wire or rod located through this notch and bent around a portion of the pole piece in rectangular shape, the ends of the shading coil wire or rod being welded or soldered together. It is in such magnetic circuit designs that the invention herein described is applicable.

Another method of mounting shading coils upon motors of this type is to provide a straight, narrow notch in one side of each pole piece and form the shading coil from a flat strip of copper or the like located through this notch and bent around a portion of the pole piece into rectangular shape, the ends of the copper strip being welded or soldered together.

The formation and installation of shading coils in the manner above described requires considerable time and labor, adding to the cost of producing the motor, and since it is necessary that the production cost be kept to a minimum, it is desirable that a pre-formed, substantially rectangular shape shading coil be provided, which may be quickly and easily installed upon the pole piece of the motor or other device and which will substantially fill the notches in the pole piece.

Furthermore the resistance of the welds is not uniform from motor to motor and the performance of the motor is adversely affected by departure from the correct value of shading coil resistance.

With this end in view, applicant has produced a pre-formed, rectangular shading coil which may be stamped or otherwise inexpensively formed, from copper or the like and which may be quickly and easily installed by inserting into the notch in one side of the pole piece and swinging the shading coil around to proper position where it will be held against accidental displacement and will substantially fill the enlarged portion of the notch in the stator laminations.

When formed as described a lower resistance is realized than can be realized in any other way for insertion in a semi-enclosed magnetic device slot except by welding, soldering or brazing, and it is more uniform than welding, soldering or brazing.

The object of the invention is to provide a novel, inexpensive and easily installed shading coil for magnetic devices.

Another object is to provide a shading coil in the form of a substantially rectangular stamping.

A further object is to provide a shading coil of this character having a cross section which substantially fills the notch in the laminated stator and having a reduced portion adapted to be inserted through the restricted entrance opening to the notch, the cross section of the reduced portion being sufficiently great as to not alter the electric resistance of the shading coil materially.

A still further object is to provide such a shading coil which may be installed by inserting the reduced portion thereof through the restricted entrance opening of the notch and sliding the coil transversely relative to the laminated stator and then rotating the coil to position around the pole piece of the stator.

Another object is to provide means for holding the shading coil in operative position when it is rotated around the pole piece.

Figure 6:
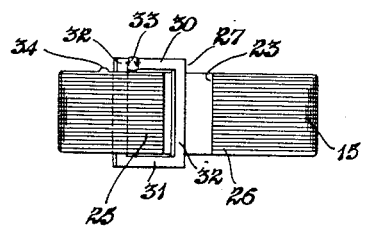
Figure 5:
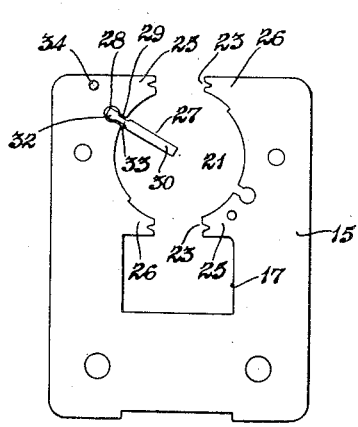
Figure 7:
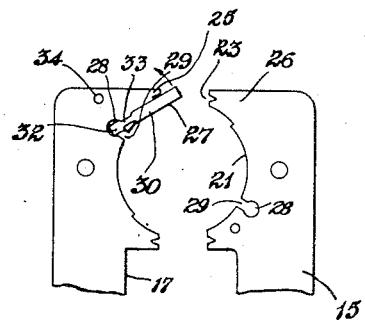

The above objects together with others which will be apparent from the drawings and following description, or which may be later referred to, may be attained by constructing the improved shading coil in the manner hereinafter described in detail and illustrated in the accompanying drawings in which:

Figure 1 is a plan view of a shaded pole type induction motor provided with the improved shading coils to which the invention pertains applied to the pole pieces;

Fig. 2 an enlarged perspective view of one of the improved shading coils;

Fig. 3 a top edge view of the shading coil shown in Fig. 3;

Fig. 4 an end elevation of the laminated stator showing one of the improved shading coils in position to be inserted in the notch in one side of one of the pole pieces thereof;

Fig. 5 a plan view of the parts in the position shown in Fig. 4;

Fig. 6 an end elevation of the laminated stator showing the first position of the shading coil after it has been inserted into the notch;

Fig. 7 a plan view of the laminated stator showing the shading coil partially rotated around one pole piece toward the operative position;

Fig. 8 a plan view of the stator showing the shading coil further rotated toward the operative position.

A type of motor to which the improved shading coil may be applied is indicated in Fig. 1 and comprises generally the stator or field member comprising a stack of laminations indicated at 15, stamped from sheets of magnetic iron and connected together in a stack as by the rivets 16 or their equivalents.

The motor shown is of a non-concentric design, the stator or field member being substantially rectangular in shape with a substantial central opening 17 therein so that one end of the stator may be surrounded by a coil 18 of wire secured upon an insulation spool 19, the ends of the coil being connected to the wires 20 which may lead to any suitable source of electric energy.

At the opposite end the stator laminations are apertured to provide a substantially circular opening 21 for receiving a cylindrical rotor 22 which may be of a squirrel cage type as shown. The laminations may be cut away on diametrically opposite sides of this cylindrical opening forming air gaps 23, an iron plate 24 being inserted between the opposite ends of the pole pieces 25 and 26 thus formed, providing a magnetic wedge between the pole pieces.

A single shading coil, indicated generally at 27, is shown surrounding each shaded pole section 25 so that a section of the pole pieces 25 are shaded while the main body of the pole pieces 26 are unshaded. Each section of a pole piece 25 has a notch 28 formed therein and communicating with the circular opening 21 through the restricted entrance opening 29, the respective shading coils being located through the notches 28 and surrounding the shaded pole section 25.

Ordinarily, in present practice, these shading coils are formed of a copper wire or strip which is located through the notch 28 and bent into substantially rectangular shape entirely around the shaded pole pieces, the ends thereof being welded or soldered together. This requires some considerable time and labor to form and install each shading coil and the results are variable in resistance and since motors of this general type are sold at a very low price, it is necessary that the manufacturing cost be held to a minimum.

The present invention contemplates the provision of a stamped or otherwise formed one-piece, hollow rectangular shading coil in the form of a closed rectangular ring, which may be quickly and easily inserted through the restricted entrance opening 29 of the notch, and which will substantially fill the enlarged portion 28 of the notch, and which may be quickly and easily installed around each shaded pole section and which will always be of optimum resistance for the particular motor.

In Figs. 2 and 3 is shown the improved shading coil which may be in the form of a hollow rectangular stamping of copper or the like comprising the upper and lower bars 30 and 31 and the vertical bars 32, of a cross sectional area sufficient to substantially fill the enlarged portion 28 of the notch, the upper bar 30 having the reduced portion 33 at one end, adjacent to one of the upright bars 32, this reduced section 33 being of such thickness that it will pass through the restricted entrance opening 29 of the notch, and being so short in length as is consistent with the design so as not to increase the resistance of the shading coil materially.

In assembling the improved type of shading coil upon the stack of laminations 15, the shading coil 27 is positioned below the stack of laminations as shown in Figs. 4 and 5, with the reduced portion 33 in the upper bar 30 of the shading coil lined up with the restricted entrance opening 29 of the notch 28, the adjacent vertical bar 32 of the shading coil being lined up with the enlarged portion 28 of the notch while the remainder of the shading coil is located beneath the circular opening 21 of the stack.

The shading coil is then pushed vertically upward, the reduced portion 33 passing upward through the restricted entrance opening 29; the adjacent vertical leg 32 of the shading coil passing upward through the notch 28, the remainder of the shading coil extending radially into the circular opening 21 of the stack of laminations, as shown in Fig. 6.

By pivoting the shading coil upon the vertical bar 32 thereof, within the notch 28, the entire shading coil is swung in the direction of the arrows shown in Figs. 7 and 8 so that the coil passes over the top and bottom edges of the stack of laminations 15 as shown in Fig. 7, and then is swung further in this direction as shown in Fig. 8 and finally swung to the position shown in Fig. 1, the other vertical bar 32 thereof contacting the outer end of the laminations 15 and the upper bar 30 thereof passing over the blister 34 upon the upper plate of the laminations, holding the shading coil in position entirely surrounding and shading the pole piece 25.

With this construction a simple, inexpensive and easily manufactured stamped shading coil of uniform resistance in the form of a rectangular ring may be quickly and easily installed around each pole piece of a magnetic assembly, being easily insertable through the restricted entrance opening of the notch in the laminations and at the same time substantially filling the enlarged portion of the notch. This results in a considerable reduction in the time and labor required over present practice of mounting shading coils upon the pole pieces of such motors.

Although the above described invention has been shown as applied to a motor for the purpose of illustration, it is not limited in its applicability to motors alone but may readily be applied to any magnetic device requiring a shaded pole section. In the specific embodiment shown the coil consists of a simple stamping, but the improved shading coil may be made by any other process such as powdered metallurgy, die casting, pre-forming or any other process to form a like piece used in similar fashion, and shading coils so formed are also comprehended as being within the scope of the invention.

I claim:

1. In a magnetic device provided with one or more pole pieces and a slot in one side of one or more of said pole pieces provided with a restricted entrance opening, a shading coil comprising a pre-formed one-piece closed rectangular ring, the upper portion of which has a reduced portion near one end for insertion longitudinally through said restricted entrance opening, the adjacent side portion of the coil being rotatably mounted in and substantially filling said slot, the other side portion of the coil located across the other side of the pole piece and the upper and lower portions of the coil located across the upper and lower sides respectively of the pole piece, and means on the top of the pole piece engaging the upper portion of the coil for holding the coil in position upon the pole piece.

2. In a magnetic device provided with one or more pole pieces and a slot in one side of one or more of said pole pieces, a shading coil comprising a one-piece stamping in the form of a closed rectangular ring, one side of the shading coil being located in and substantially filling said slot, the opposite side thereof located across the opposite side of the pole piece and the upper and lower sides of the coil located across the upper and lower faces of the pole piece, and means on the top of the pole piece engaging the upper side of the coil for holding the coil in position upon the pole piece.

3. In a magnetic device provided with one or more pole pieces and a slot in one side of one or more of said pole pieces, provided with a restricted entrance opening, a shading coil comprising a one-piece stamping in the form of a closed rectangular ring, one side of the shading coil being located in and substantially filling said slot, the opposite side thereof located across the opposite side of the pole piece and the upper and lower sides of the coil located across the upper and lower faces of the pole pieces, one of the latter sides of the coil having a reduced portion for insertion longitudinally through said restricted entrance opening, and means on the top of the pole piece engaging the upper side of the coil for holding the coil in position upon the pole piece.

4. As an article of manufacture, a shading coil for use in a magnetic device having a semi-enclosed slot therein, said shading coil comprising a pre-formed, one-piece continuous closed ring the thickness of which is restricted for at least a portion of its length, whereby it may be inserted into the semi-enclosed slot of the magnetic device, the thickness of the remainder of the shading coil being greater than the width of the entrance to the slot.

5. As an article of manufacture, a shading coil for use in a magnetic device having a pole piece with a semi-enclosed slot therein, said shading coil comprising a pre-formed, one-piece continuous closed ring, one side of the shading coil being adapted to be located in said slot and having a restricted section for insertion into the slot, the opposite side of said coil being adapted for location across the opposite side of the pole piece and the upper and lower sides of the coil being adapted for location across the upper and lower faces of the pole piece.

6. As an article of manufacture, a shading coil for use in a magnetic device provided with a pole piece having a slot in one side thereof provided with a restricted entrance opening, said shading coil comprising a pre-formed, one-piece, closed rectangular ring, one side of the shading coil being adapted to be located in and substantially fill the slot, the opposite side of the coil being adapted to be located across the opposite side of the pole piece and the upper and lower sides of the coil being adapted to be located across the upper and lower faces of the pole piece, one of the latter sides of the coil having a reduced portion adapted to be inserted longitudinally through said restricted entrance opening.

7. As an article of manufacture, a shading coil for use in a magnetic device provided with a pole piece having a slot in one side thereof, said slot being provided with a restricted entrance opening, said shading coil comprising a pre-formed, one-piece closed rectangular ring the upper portion of which has a reduced portion near one end adapted to be inserted longitudinally through the restricted entrance opening, the adjacent side portion of the coil being adapted to be rotatably mounted in and to substantially fill the slot, the other side portion of the coil being adapted to be located across the other side of the pole piece, and the upper and lower portions of the coil being adapted to be located across the upper and lower sides respectively of the pole pieces.

JAMES B. HARDIE.

REFERENCES CITED

The following references are of record in the file of this patent:

UNITED STATES PATENTS

| Number | Name | Date |
| --- | --- | --- |
| 1,983,091 | Larah | Dec. 4, 1934 |
| 2,092,339 | Steenbeck | Sept. 7, 1937 |